US010255803B2

(12) United States Patent
Uno

(10) Patent No.: US 10,255,803 B2
(45) Date of Patent: Apr. 9, 2019

(54) VEHICLE IMAGE DATA TRANSMISSION DEVICE

(71) Applicant: TOYOTA JIDOSHA KABUSHIKI KAISHA, Toyota-shi, Aichi-ken (JP)

(72) Inventor: Satoshi Uno, Tokyo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 121 days.

(21) Appl. No.: 15/215,062

(22) Filed: Jul. 20, 2016

(65) Prior Publication Data

US 2017/0132918 A1 May 11, 2017

(30) Foreign Application Priority Data

Nov. 11, 2015 (JP) ................................. 2015-221180

(51) Int. Cl.
*G08G 1/01* (2006.01)
*H04L 12/801* (2013.01)
*H04L 29/08* (2006.01)
*G08G 1/04* (2006.01)
*G08G 1/0967* (2006.01)

(52) U.S. Cl.
CPC ......... *G08G 1/0141* (2013.01); *G08G 1/0112* (2013.01); *G08G 1/0133* (2013.01); *G08G 1/04* (2013.01); *G08G 1/096716* (2013.01); *G08G 1/096741* (2013.01); *G08G 1/096775* (2013.01);
(Continued)

(58) Field of Classification Search
CPC .. G08G 1/0141; G08G 1/0112; G08G 1/0133; G08G 1/04; G08G 1/096716; G08G 1/096741; G08G 1/096775; H04L 47/12; H04L 67/12; H04L 67/327
See application file for complete search history.

(56) References Cited

U.S. PATENT DOCUMENTS 8,670,897 B1 * 3/2014 Ralson ................ G06F 11/3013
701/29.1
2004/0257208 A1 * 12/2004 Huang .................. B60R 25/102
340/426.1
(Continued)

FOREIGN PATENT DOCUMENTS

CN 103813140 A 5/2014
CN 104170326 A 11/2014
(Continued)

*Primary Examiner* — Nay Tun
(74) *Attorney, Agent, or Firm* — Sughrue Mion, PLLC

(57) ABSTRACT

A vehicle image data transmission device that transmits image data obtained by capturing an image of a vehicle exterior to a management center managing travel information of vehicles includes an on-vehicle communication device and a communication controller. The communication controller is configured to transmit image data of the vehicle exterior to a record device to the on-vehicle communication device through the internal network when a communication load of the internal network is less than a first predetermined value. The on-vehicle communication device includes a memory storing image data received from the communication controller and is configured to transmit image data stored in the memory to the management center through a vehicle external network when a communication load of the external network is less than a second predetermined value.

9 Claims, 8 Drawing Sheets

(52) U.S. Cl.
CPC .............. *H04L 47/12* (2013.01); *H04L 67/12* (2013.01); *H04L 67/327* (2013.01)

(56) References Cited

U.S. PATENT DOCUMENTS

| | | | | |
|---|---|---|---|---|
| 2008/0288162 | A1* | 11/2008 | Theimer | G08G 1/164 |
| | | | | 701/117 |
| 2009/0096576 | A1* | 4/2009 | Oman | G07C 5/008 |
| | | | | 340/5.62 |
| 2010/0030474 | A1* | 2/2010 | Sawada | B62D 15/0265 |
| | | | | 701/301 |
| 2012/0001771 | A1* | 1/2012 | Roth | B60W 50/14 |
| | | | | 340/905 |
| 2012/0316768 | A1* | 12/2012 | Haran | G08G 1/168 |
| | | | | 701/300 |
| 2014/0104408 | A1 | 4/2014 | Nanba | |
| 2014/0172296 | A1* | 6/2014 | Shtukater | G01S 19/13 |
| | | | | 701/522 |
| 2015/0055473 | A1 | 2/2015 | Moriya | |
| 2015/0195518 | A1* | 7/2015 | Shikii | B60R 25/1006 |
| | | | | 348/148 |
| 2015/0294563 | A1* | 10/2015 | Korenaga | G08G 1/0116 |
| | | | | 701/117 |
| 2016/0046237 | A1 | 2/2016 | Sugimoto et al. | |

FOREIGN PATENT DOCUMENTS

| | | |
|---|---|---|
| JP | 10336734 A | 12/1998 |
| JP | 2005-222307 A | 8/2005 |
| JP | 2006350520 A | 12/2006 |
| JP | 2014-081831 A | 5/2014 |
| JP | 2014228637 A | 12/2014 |
| JP | 2015-064830 A | 4/2015 |
| WO | 2013136496 A1 | 9/2013 |
| WO | 2014167701 A1 | 10/2014 |

* cited by examiner

Fig.3

| Travel Easiness Score | Easiness Factor | Score |
|---|---|---|
| 55 |  | 100 (Base Score) |
|  | Pedestrians | -15 |
|  | Bicycles | -10 |
|  | Other Vehicles | -20 |

Fig.4

| Road Link ID | Image Data | Travel Easiness Score | Obtained Time |
|---|---|---|---|
| 0200001 | Image A | 55 | Y/M/D/Time |
| ⋮ | ⋮ | ⋮ | ⋮ |

Fig.5A

| Travel Easiness (Travel Environment) \ Vehicle State | When traveling (Internal network has large load) | When parked or stopped (Internal network has small load) |
|---|---|---|
| Difficult or Easy | Internal Network: Transmit travel easiness score | Internal Network: Transmit travel easiness score and image |

Fig.5B

| Travel Easiness (Travel Environment) \ Elapsed Time | Within 5 min (high freshness) | 5 to 15 min (medium freshness) | Exceed 15 min (low freshness) |
|---|---|---|---|
| Difficult (High value to driver) | Transmit with high priority | Transmit with high priority | Delete from travel easiness database |
| Easy (Low value to driver) | Transmit with low priority | Delete from travel easiness database | Delete from travel easiness database |

Fig.7A

| Travel Easiness (Travel Environment) \ Vehicle State | When traveling or parked/stopped |
|---|---|
| Difficult (≈many vehicles and pedestrians) (External network has large load) | External Network: Transmit travel easiness score |
| Easy (≈few vehicles and pedestrians) (External network has small load) | External Network: Transmit travel easiness score and image |

Fig.7B

| Travel Easiness (Travel Environment) \ Elapsed Time | Within 5 min (high freshness) | 5 to 15 min (medium freshness) | Exceed 15 min (low freshness) |
|---|---|---|---|
| Difficult (High value to driver) | Transmit with high priority | Transmit with high priority | Delete from memory |
| Easy (Low value to driver) | Transmit with low priority | Delete from memory | Delete from memory |

Fig.9

| Travel Easiness Level |
|:---:|
| A |
| B |
| C |
| D |
| E |

VEHICLE IMAGE DATA TRANSMISSION DEVICE

BACKGROUND OF THE INVENTION

The present invention relates to an image data transmission device that is used for a vehicle and transmits image data obtained by the vehicle to a management center, which manages travel information from a plurality of vehicles.

Japanese Laid-Open Patent Publication No. 2015-64830 describes such type of vehicle image data transmission device (system) known in the prior art. When determined that the vehicle is in a traffic jam, the device transmits captured image data together with position information and traffic information of the location where the image is captured to a collection device (management center) as captured information. When the vehicle requests the collection device (management center) to provide the captured information, the collection device (management center) provides the corresponding captured information to the vehicle.

The image data transmission to the management center from the vehicle may cause an excessive communication load on a mobile communication system (network) due to limitations imposed on the communication capacity and the communication speed of the mobile communication system. Such a situation is particularly prominent when the vehicle is in a traffic jam or the like. Increases in the communication load may extend transmission time of the image data or interrupt the transmission of the image data. Additionally, when the vehicle transmits the image data, the load of the on-vehicle network may vary. Thus, the captured image data may not always be transmitted to the management center.

SUMMARY OF THE INVENTION

It is an object of the present invention to provide an image data transmission device that is used for a vehicle and capable of transmitting image data obtained by the vehicle to a management center with high reliability while taking into consideration a vehicle internal network environment and a vehicle external network environment.

In one aspect of the present disclosure, a vehicle image data transmission device transmits image data obtained when driving the vehicle by capturing an image of a vehicle exterior to a management center that manages travel information of a plurality of vehicles. The vehicle image data transmission device includes an on-vehicle communication device configured to communicate with the management center through a vehicle external network for mobile communication, an image obtaining unit that obtains the image data of the vehicle exterior, a record device that records image data obtained from the image obtaining unit, and a communication controller configured to transmit image data recorded in the record device to the on-vehicle communication device through a vehicle internal network mounted in the vehicle under a condition in which the vehicle internal network has a communication load that is less than a first predetermined value. The on-vehicle communication device includes a memory that stores image data received from the communication controller. The on-vehicle communication device is configured to transmit image data stored in the memory to the management center under a condition in which the vehicle external network has a communication load that is less than a second predetermined value.

In a further aspect of the present disclosure, a vehicle image data transmission device transmits image data obtained when driving the vehicle by capturing an image of a vehicle exterior to a management center that manages travel information of a plurality of vehicles. The vehicle image data transmission device includes an on-vehicle communication device configured to communicate with the management center through a vehicle external network for mobile communication, an on-vehicle camera that obtains the image data of the vehicle exterior, an on-vehicle database that records the image data obtained from the on-vehicle camera, and a processing circuit configured to transmit image data recorded in the on-vehicle database to the on-vehicle communication device through a vehicle internal network mounted in the vehicle under a condition in which the vehicle internal network has a communication load that is less than a first predetermined value. The on-vehicle communication device includes a memory that stores image data received from the processing circuit. The on-vehicle communication device is configured to transmit image data stored in the memory to the management center under a condition in which the vehicle external network has a communication load that is less than a second predetermined value.

In one aspect of the present disclosure, a method for transmitting image data for a vehicle includes obtaining image data when driving the vehicle by capturing an image of a vehicle exterior with an on-vehicle camera, recording the obtained image data in an on-vehicle database, transmitting image data recorded in the on-vehicle database to an on-vehicle communication device through a vehicle internal network mounted in the vehicle under a condition in which the vehicle internal network has a communication load that is less than a first predetermined value, storing image data transmitted through the vehicle internal network in a memory included in the on-vehicle communication device, and transmitting image data stored in the memory to a management center through a vehicle external network for mobile communication under a condition in which the vehicle external network has a communication load that is less than a second predetermined value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a table showing one example of a travel easiness score calculated by the vehicle image data transmission device of FIG. 2 and its associated information;

FIG. 4 is a table showing one example of data contents registered in a travel easiness database of the vehicle image data transmission device of FIG. 2;

FIG. 5A is a table showing one example of data contents that are subject to transmission through a vehicle internal network in data transmission control executed by the vehicle image data transmission device of FIG. 2;

FIG. 5B is a table showing one example of data saving management performed on the travel easiness database in data transmission control executed by the vehicle image data transmission device of FIG. 2 through the vehicle internal network;

FIG. 7A is a table showing one example of data contents that are subject to transmission through a vehicle external network in data transmission control executed by the vehicle image data transmission device of FIG. 2;

FIG. 7B is a table showing one example of data saving management performed on a memory of an on-vehicle communication device in data transmission control executed by the vehicle image data transmission device of FIG. 2 through the vehicle external network;

FIG. 9 is a table showing one example of levels hierarchized based on characteristics of the entire image, which is another example for evaluating the easiness to travel.

DETAILED DESCRIPTION OF THE PREFERRED EMBODIMENTS

A vehicle image data transmission system to which a vehicle image data transmission device is applied will now be briefly described with reference to FIG. 1.

Figure 1:
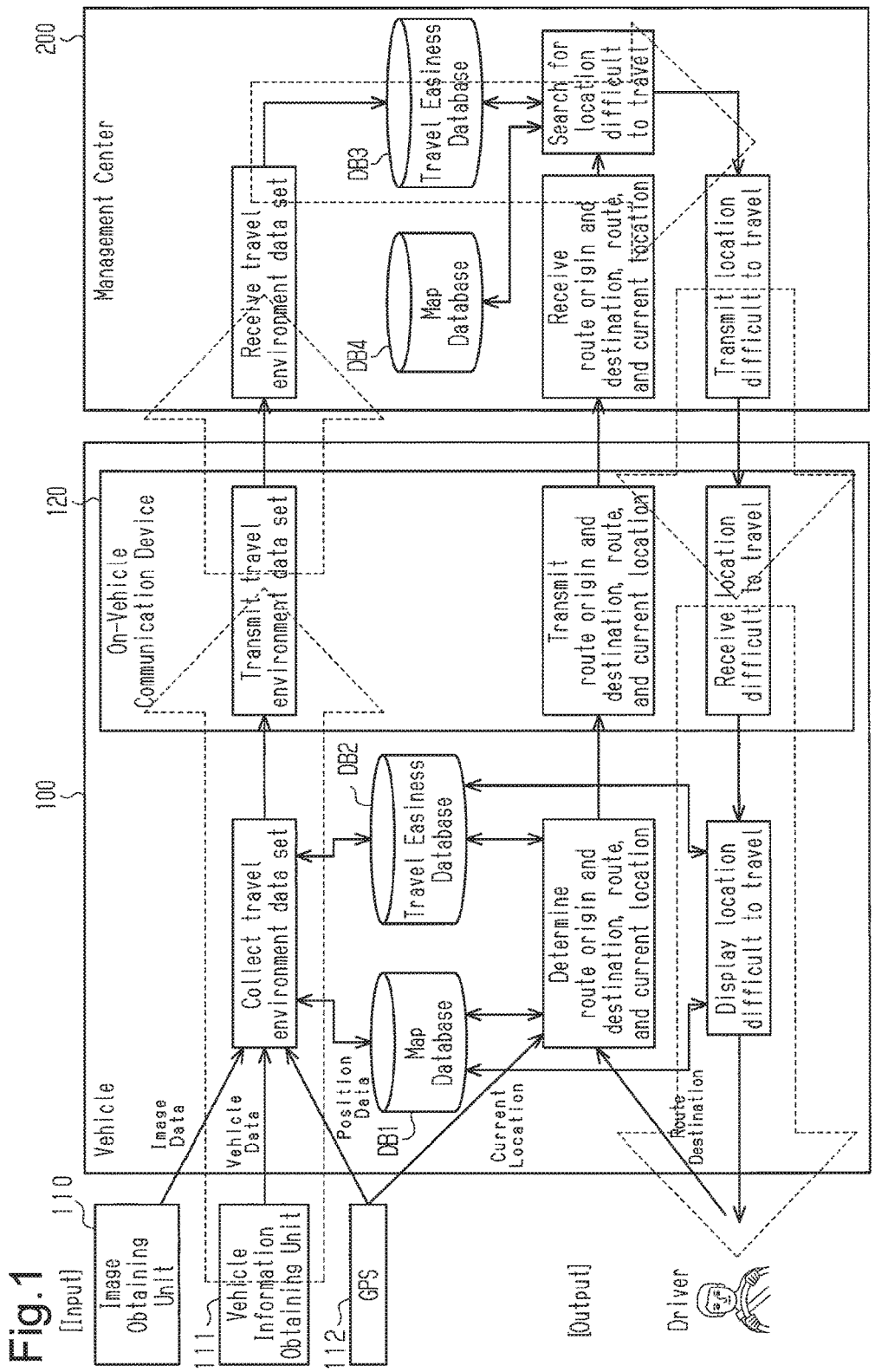
FIG. 1 is a schematic block diagram showing the function of a vehicle image data transmission system including a management center in accordance with the flow of each data.

As shown in FIG. 1, the vehicle image data transmission system transmits a data set (uploads data), which is related to a travel environment collected when driving the vehicle, to a management center that manages the travel information from a plurality of vehicles through wireless communication. After the management center analyzes the transmitted data set related to the travel environment, the data set is provided (data is downloaded) to a vehicle and used for a route guide of the vehicle as necessary.

More specifically, when transmitting the data set related to the travel environment (uploading data), a vehicle 100 obtains image data of a vehicle external image captured by an image obtaining unit 110, which is, for example, an on-vehicle camera. The vehicle 100 also obtains vehicle data, which indicates a travel state and an operation state of the vehicle, from a vehicle information obtaining unit 111. The vehicle information obtaining unit 111 includes an engine controller, a brake controller, and the like. Each controller includes a microcomputer or a processing circuit that includes, for example, a central processing unit (CPU), a read only memory (ROM), a random access memory (RAM), a backup RAM, an external input circuit, and an external output circuit. The vehicle 100 also obtains the present position data of the vehicle from a global positioning system 112 (GPS). The vehicle 100 calculates a travel easiness score that indicates the easiness for the vehicle to travel, which reflects the number of other vehicles and pedestrians, based on the vehicle external image data collected from the image obtaining unit 110. The vehicle 100 associates the travel easiness score with a road link ID, which is specified based on the position data obtained from the GPS 112 with reference to a map database DB1, and collects the travel easiness score together with the image data, which is the source for evaluation, as a data set related to the travel environment. Then, the vehicle 100 stores the collected data set related to the travel environment in a travel easiness database DB2. Further, the vehicle 100 transmits the data set related to the travel environment, which is stored in the travel easiness database DB2, to an on-vehicle communication device 120 through an on-vehicle network and also transmits the data set (uploads data) from the on-vehicle communication device 120 to a management center 200 through an vehicle external network.

When analyzing the data set related to the travel environment, the management center 200 stores the data set of the travel environment, which is received from the on-vehicle communication device 120, in a travel easiness database DB3. When the driver of the vehicle 100 sets a route destination of the vehicle 100 using a navigation system, the management center 200 receives a route from the route origin to the route destination, in addition to the information of the current location of the vehicle 100 that is determined based on the position data obtained through the GPS 112, from the on-vehicle communication device 120. Based on the received information, the management center 200 also specifies a road link that is located in the vicinity of the vehicle 100 on the route from the route origin to the route destination with reference to a map database DB4. Then, the management center 200 selects a travel easiness score corresponding to the specified road link ID from the travel easiness database DB3 and searches for a location having a travel easiness score that is less than a predetermined score indicating that the location has a difficult traveling tendency.

When providing data (data is downloaded) to the vehicle 100, the management center 200 associates a travel easiness score of the searched location having the difficult traveling tendency with the image data, which is the source for evaluation, and transmits the travel easiness score together with the corresponding load link ID to the on-vehicle communication device 120. The vehicle 100 adds, to the travel easiness database DB2, various types of received information related to the location having a travel easiness score indicating the difficult traveling tendency. Subsequently, when the driver performs operation for requesting the travel easiness score, the vehicle 100 specifies a desired road link ID with reference to the map database DB1. The vehicle 100 retrieves the travel easiness score and the associated image data from the travel easiness database DB2 to show the driver through the navigation system.

The configuration of the vehicle image data transmission device of the present embodiment will now be described.

Figure 2:
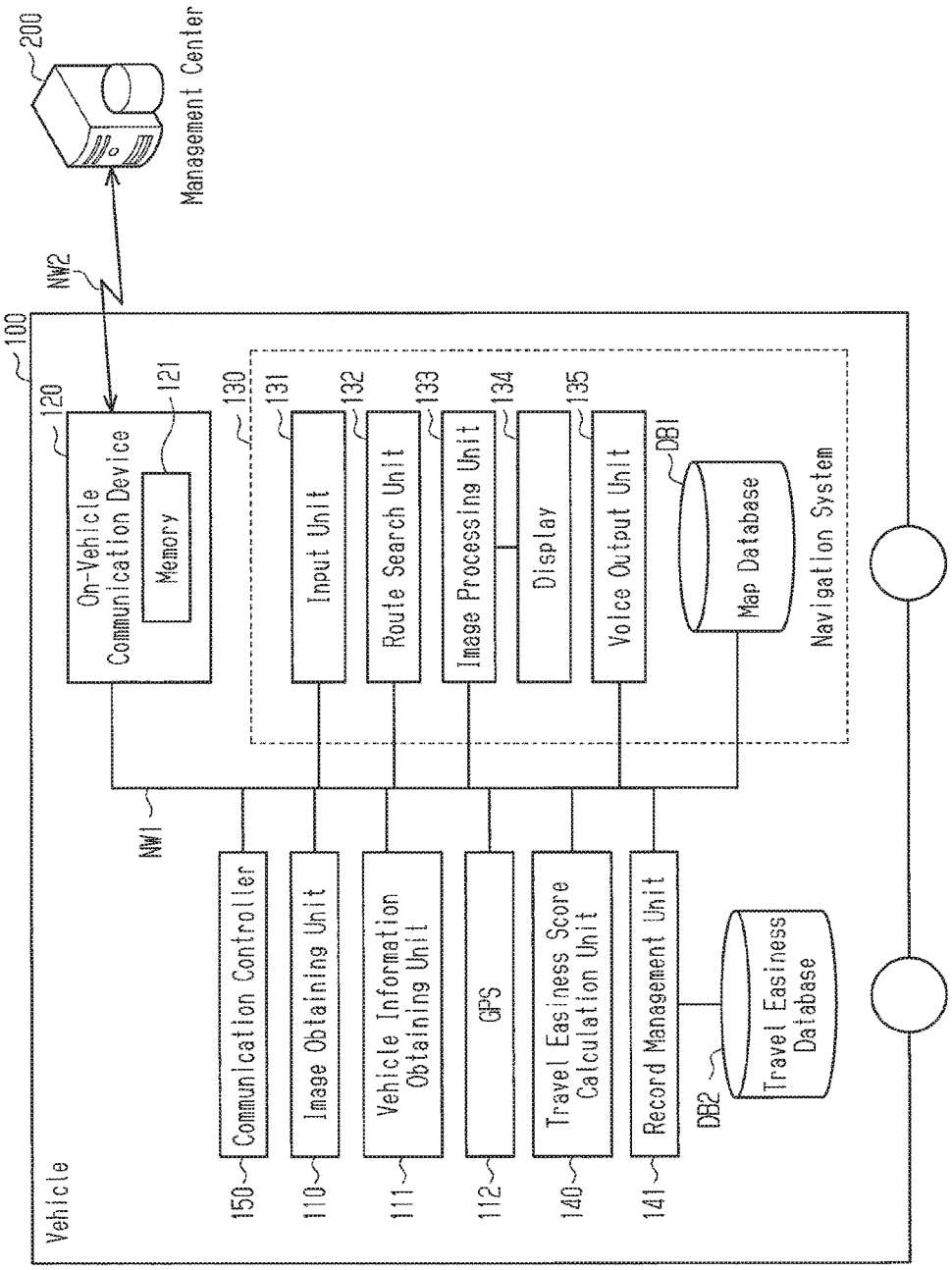
FIG. 2 is a block diagram showing the structure of one embodiment of a vehicle image data transmission device included in the system shown in FIG. 1.

As shown in FIG. 2, the vehicle 100 includes a navigation system 130, which performs the route guidance of the vehicle 100. The navigation system 130 includes a microcomputer or a processing circuit that includes, for example, a central processing unit (CPU), a read only memory (ROM), a random access memory (RAM), a backup RAM, an external input circuit, and an external output circuit. The navigation system 130 includes a route search unit 132 that searches for an optimal route from the current location of the vehicle 100, which is specified through the GPS 112, to a route destination, which is inputted through an input unit 131. The route search unit 132 searches for the optimal route on map data registered in the map database DB1 with reference to the travel easiness score of each area using Dijkstra's algorithm. The navigation system 130 performs the guidance of the optimal route, which has been searched by the route search unit 132, by displaying on a guide screen of a display 134 through an image processing unit 133 or outputting voice guidance from a voice output unit 135.

The vehicle 100 also includes an image obtaining unit 110, which captures an image of the circumstance around the vehicle 100. The image obtaining unit 110 includes, for example, an on-vehicle camera. Image data obtained from the image obtaining unit 110 is sent to a travel easiness score calculation unit 140 through a vehicle internal network NW1, for example, a controller area network (CAN), and used to calculate the travel easiness score, which indicates the easiness for the vehicle to travel.

The travel easiness score calculation unit 140 includes a microcomputer or a processing circuit that includes, for example, a central processing unit (CPU), a read only memory (ROM), a random access memory (RAM), a backup RAM, an external input circuit, and an external output circuit. When calculating the travel easiness score, the travel easiness score calculation unit 140 performs an image recognition process on the image date obtained from the image obtaining unit 110 and analyzes the state indicated by the image data as a traffic state for each set item. Various elements that hinder the vehicle from traveling, for example, the number of pedestrians, the number of bicycles, and the number of other vehicles around the vehicle, are set as the items defining the traffic state. The travel easiness score calculation unit 140 calculates an evaluation value for each item obtained from the analysis of the image data and adds the evaluation values to obtain the travel easiness score.

In the example shown in FIG. 3, as the evaluation values based on the traffic state, a subtraction element "−15" is set based on the presence of pedestrians around the vehicle, a subtraction element "−10" is set based on the presence of bicycles around the vehicle, and a subtraction element "−20" is set based on the presence of other vehicles around the vehicle. The travel easiness score "55" is calculated by subtracting "−45," which is the added value of the subtraction elements, from a base score "100."

The image data obtained from the image obtaining unit 110 is also sent to a record management unit 141 through the vehicle internal network NW1. The record management unit 141 includes a microcomputer or a processing circuit that includes, for example, a central processing unit (CPU), a read only memory (ROM), a random access memory (RAM), a backup RAM, an external input circuit, and an external output circuit. When the image data is obtained from the image obtaining unit 110, the record management unit 141 specifies the corresponding road link ID based on information related to the vehicle location that is obtained at the same time through the GPS 112 with reference to the map database DB1.

As shown in FIG. 4, the record management unit 141 stores the image data, the travel easiness score, and the time when the image data is obtained, associated with the specified load link ID, in the travel easiness database DB2 as a travel environment data set. The travel environment data set stored in the travel easiness database DB2 is transmitted from the record management unit 141 to the on-vehicle communication device 120 through the vehicle internal network NW1 based on data transmission control executed by a communication controller 150.

The communication controller 150 includes a microcomputer or a processing circuit that includes, for example, a central processing unit (CPU), a read only memory (ROM), a random access memory (RAM), a backup RAM, an external input circuit, and an external output circuit. The communication controller 150 executes control for transmitting data to the on-vehicle communication device 120 from the record management unit 141 while monitoring a communication load of the vehicle internal network NW1.

The communication load of the vehicle internal network NW1 is determined based on vehicle data showing the vehicle travel state collected from the vehicle information obtaining unit 111. When determined that the vehicle is parked or stopped based on the vehicle data collected from the vehicle information obtaining unit 111, the communication controller 150 determines that the communication load of the vehicle internal network NW1 is less than a predetermined value. When determined that the vehicle is traveling based on the vehicle data collected from the vehicle information obtaining unit 111, the communication controller 150 determines that the communication load of the vehicle internal network NW1 is greater than or equal to the predetermined value. This is because when the vehicle 100 is traveling, an on-vehicle control device tends to frequently output signals related to basic vehicle operations, particularly, "running, turning, and stopping," to the vehicle internal network NW1 as compared to when the vehicle is parked or stopped. Thus, it is assumed that the communication load of the vehicle internal network NW1 accordingly tends to be increased. For example, in the CAN (controller area network), which is widely used as a vehicle internal network, a change in the state of the on-vehicle control device or an update of a sensor value triggers transmission of a CAN frame for event transmission. Thus, when the vehicle 100 is traveling, the communication load of the CAN accordingly tends to be increased as compared to when the vehicle 100 is parked or stopped due to a circumstance in which the change in the state of the on-vehicle control device or the update of the sensor value are likely to occur.

The on-vehicle communication device 120 shown in FIG. 2 includes a microcomputer or a processing circuit that includes, for example, a central processing unit (CPU), a read only memory (ROM), a random access memory (RAM), a backup RAM, an external input circuit, and an external output circuit. The on-vehicle communication device 120 performs wireless communication with the management center 200 through a vehicle external network NW2, which is a network for mobile communication. As described above, when the various kinds of data are transmitted to the on-vehicle communication device 120 from the record management unit 141 through the vehicle internal network NW1, the data is temporarily stored in a memory 121 of the on-vehicle communication device 120 and transmitted from the on-vehicle communication device 120 to the management center 200 through the vehicle external network NW2.

The on-vehicle communication device 120 executes control for transmitting data to the management center 200 while monitoring a communication load of the vehicle external network NW2. The communication load of the vehicle external network NW2 is determined based on the travel easiness score that is reflected by the present traffic state of the vehicle as described above. More specifically, the on-vehicle communication device 120 obtains, through the vehicle internal network NW1, the travel easiness score calculated by the travel easiness score calculation unit 140 based on the present image data obtained from the image obtaining unit 110 when driving the vehicle 100. When the travel easiness score is greater than or equal to a predetermined score indicating an easy traveling tendency, the on-vehicle communication device 120 determines that the communication load of the vehicle external network NW2 is less than a predetermined value. When the travel easiness score is less than the predetermined score indicating the difficult traveling tendency, the on-vehicle communication device 120 determines that the communication load of the vehicle external network NW2 is greater than the predetermined value. This is based on an assumption that the communication environment of the vehicle external network NW2 around the vehicle is unstable, for example, due to other vehicles having a communication function or portable communication terminals carried by pedestrians, if the travel easiness score of the vehicle, which is calculated by reflecting the number of other vehicles and pedestrians, indicates the difficult traveling tendency. The travel easiness score may be calculated with reference to the vehicle data, for example, information of vehicle operation performed by the driver.

When the driver sets a route destination of the vehicle 100 using the navigation system 130, the vehicle 100 receives the travel easiness score corresponding to the vicinity of the vehicle 100 on the route from the route origin to the route destination, which is searched by the navigation system 130, together with the image data, which is the source for evaluation, from the management center 200. The record management unit 141 stores the travel easiness score and the image data, which are received from the management center 200, in the travel easiness database DB2. More specifically, the travel easiness database DB2 stores the travel easiness score and the image data that are provided from the management center 200 in addition to the image data and the associated travel easiness score that are obtained by the vehicle 100 from the image obtaining unit 110 and the travel easiness score calculation unit 140. In the travel easiness database DB2, a memory region for storing various kinds of data obtained by the vehicle 100 is set separately from a memory region for storing various kinds of data provided from the management center 200. When the record management unit 141 performs data saving management on the travel easiness database DB2, only the memory region for storing various kinds of data obtained by the vehicle 100 is subject to the data saving management, which will be described later.

When the driver of the vehicle 100 requests the travel easiness score using the input unit 131 of the navigation system 130, the record management unit 141 retrieves a desired travel easiness score and associated image data from the travel easiness database DB2 to output to the image processing unit 133. The image processing unit 133 shows the driver the received travel easiness score, which is ranked in five levels, for example, "A," "B," "C," "D," and "E," and the image data on the display 134.

The data transmission control executed by the vehicle image data transmission device of the present embodiment through the vehicle internal network NW1 will now be described.

FIG. 5A shows one example of data contents that are subject to transmission in the data transmission control through the vehicle internal network NW1. As shown in FIG. 5A, the communication controller 150 regularly transmits the travel easiness score, which has a relatively small data size among the transmission subjects of data, regardless of the communication load of the vehicle internal network NW1. However, the communication controller 150 transmits the image data, which has a relatively large data size among the transmission subjects of data, when the vehicle 100 is parked or stopped, that is, under a condition in which the communication load of the vehicle internal network NW1 is less than the predetermined value.

FIG. 5B shows one example of data saving management performed on the travel easiness database DB2 in the data transmission control through the vehicle internal network NW1. As shown in FIG. 5B, under a condition in which an available recordable amount of the travel easiness database DB2 is less than a predetermined value, the record management unit 141 controls whether or not to save image data stored in the travel easiness database DB2 while monitoring the travel easiness score determined based on the image data and the time elapsed from when the image data was obtained. More specifically, the record management unit 141 manages image data having a travel easiness score that is less than the predetermined score indicating the difficult traveling tendency in the following manner. The record management unit 141 saves image data in which time elapsed from when the image data was obtained is "within five minutes" or "between five and fifteen minutes" and thus the image data has relatively high freshness in the travel easiness database DB2 as a transmission subject. The record management unit 141 deletes image data in which time elapsed from when the image data was obtained is "more than fifteen minutes" and thus the image data has relatively low freshness from the travel easiness database DB2.

Additionally, the record management unit 141 manages image data having a travel easiness score that is greater than or equal to the predetermined score indicating the easy traveling tendency in the following manner. The record management unit 141 saves only image data in which time elapsed from when the image data was obtained is "within five minutes" and thus the image data has particularly high freshness in the travel easiness database DB2 as a transmission subject. The record management unit 141 deletes image data in which time elapsed from when the image data was obtained is "between five and fifteen minutes" and "more than fifteen minutes" and thus the image data has relatively low freshness from the travel easiness database DB2.

In the present embodiment, when determined that the effectiveness of image data has been decreased as the time elapsed from when the image data was obtained, the image data is deleted from the travel easiness database DB2. Allowed time (first allowed time) before the data deletion is set so that the allowed time ("fifteen minutes") of image data having a travel easiness score indicating the difficult traveling tendency is longer than the allowed time ("five minutes") of image data having a travel easiness score indicating the easy traveling tendency. Thus, the image data having a travel easiness score indicating the difficult traveling tendency takes priority and remains in the travel easiness database DB2 while the available recordable amount of the finite travel easiness database DB2 is appropriately maintained. When the management center 200 provides, for example, the travel easiness level of a certain area, the area may be evaluated as easy but actually difficult to travel. The difference between the evaluation and the actual state may particularly provide the driver a strong uncomfortable feel. In this regard, the image data having a travel easiness score indicating the difficult traveling tendency is assumed to be relatively more valuable than the image data having a travel easiness score indicating the easy traveling tendency as information uploaded through the on-vehicle communication device 120.

In the present embodiment, when image data having a travel easiness score indicating the difficult traveling tendency and image data having a travel easiness score indicating the easy traveling tendency are both in the travel easiness database DB2, the image data having a travel easiness score indicating the difficult traveling tendency is given priority and transmitted even when the time elapsed from when the image data was obtained is within the above allowed time. This also increases the frequency for transmitting the image data having a travel easiness score indicating the difficult traveling tendency from the vehicle 100 to the management center 200.

The procedures of data transmission control performed by the vehicle image data transmission device of the present embodiment through the vehicle internal network NW1 will now be described with reference to the flowchart shown in FIG. 6. The data transmission control is repeated in a predetermined cycle. In parallel with the data transmission control shown in FIG. 6, a process for storing the image data and the travel easiness score in the travel easiness database DB2 is performed in a predetermined cycle.

Figure 6:
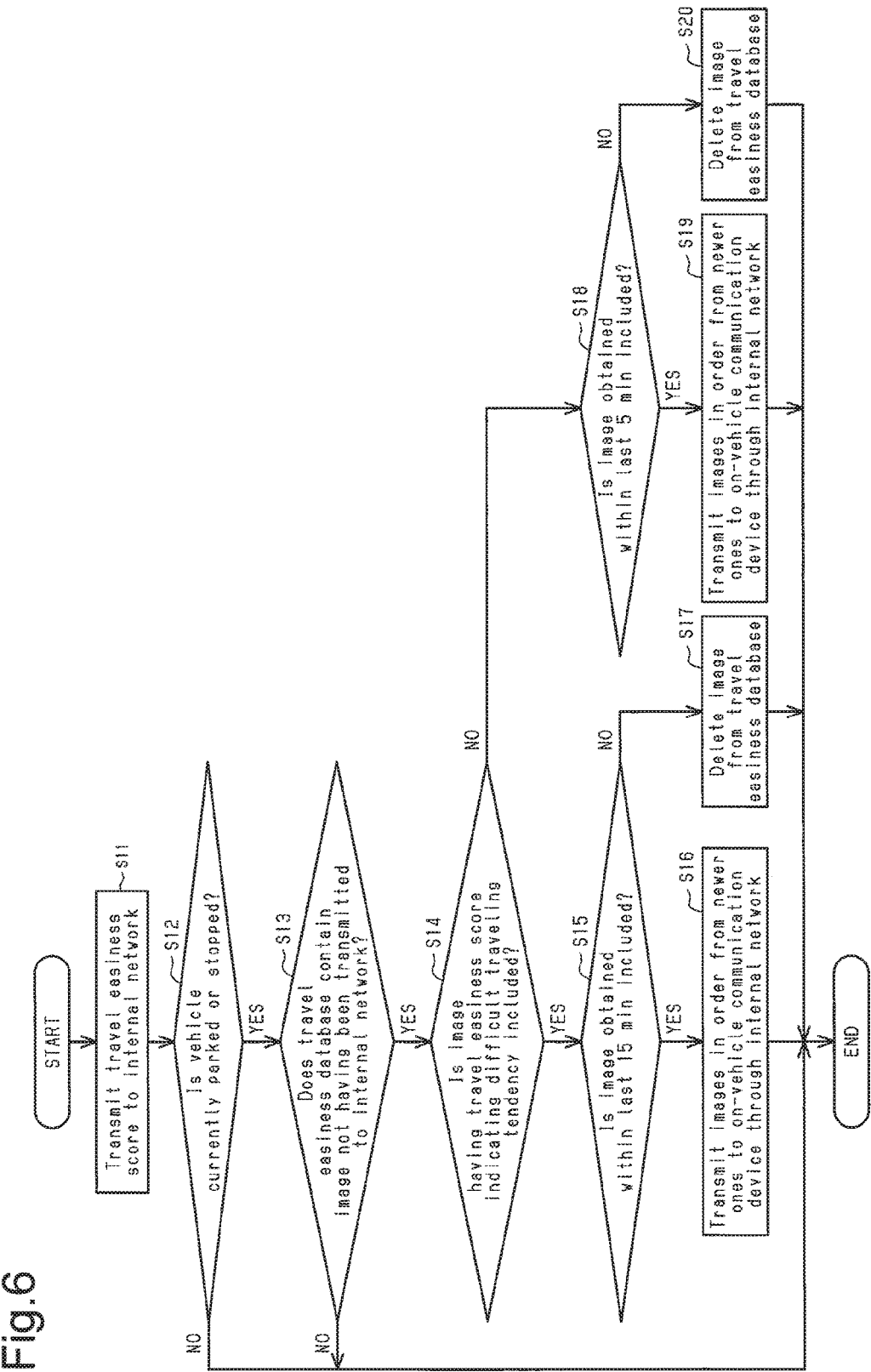
FIG. 6 is a flowchart showing the procedures of data transmission control executed by the vehicle image data transmission device of FIG. 2 through the vehicle internal network.

As shown in FIG. 6, the vehicle image data transmission device transmits a travel easiness score that is stored in the travel easiness database DB2 to the on-vehicle communication device 120 from the record management unit 141 through the vehicle internal network NW1 (step S11).

The vehicle image data transmission device determines, using the communication controller 150, whether or not the vehicle 100 is parked or stopped based on the vehicle data obtained from the vehicle information obtaining unit 111 (step S12). When determined that the vehicle 100 is parked or stopped (step S12=YES), the vehicle image data transmission device determines, using the record management unit 141, whether or not the travel easiness database DB2 contains image data that has not been transmitted to the vehicle internal network NW1 (step S13).

When the image data not having been transmitted is contained (step S13=YES), the vehicle image data transmission device determines, using the record management unit 141, whether or not the image data includes image data having a travel easiness score indicating the difficult traveling tendency (step S14).

When the image data having a travel easiness score indicating the difficult traveling tendency is included (step S14=YES), the vehicle image data transmission device determines, using the record management unit 141, whether or not the image data includes image data in which time elapsed from when the image data was obtained is within fifteen minutes (step S15).

When the image data having a travel easiness score indicating the difficult traveling tendency includes image data in which time elapsed from when the image data was obtained is within fifteen minutes (step S15=YES), the vehicle image data transmission device transmits pieces of the image data in order from ones having newer obtained date and time to the on-vehicle communication device 120 from the record management unit 141 through the vehicle internal network NW1 (step S16) and then ends the data transmission control shown in FIG. 6.

When the image data having a travel easiness score indicating the difficult traveling tendency does not include image data in which time elapsed from when the image data was obtained is within fifteen minutes (step S15=NO), the vehicle image data transmission device deletes the image data from the travel easiness database DB2 using the record management unit 141 under the condition in which the available recordable amount of the travel easiness database DB2 is less than the predetermined value (step S17) and then ends the data transmission control shown in FIG. 6.

In step S14, when the image data having a travel easiness score indicating the difficult traveling tendency is not included (step S14=NO), the vehicle image data transmission device determines, using the record management unit 141, whether or not the image data not having been transmitted includes image data in which time elapsed from when the image data was obtained is within five minutes (step S18).

When image data in which time elapsed from when the image data was obtained is within five minutes is included (step S18=YES), the vehicle image data transmission device transmits pieces of the image data in order from ones having newer obtained date and time to the on-vehicle communication device 120 from the record management unit 141 through the vehicle internal network NW1 (step S19) and then ends the data transmission control shown in FIG. 6.

When the image data not having been transmitted does not include image data in which time elapsed from when the image data was obtained is within five minutes (step S18=NO), the vehicle image data transmission device deletes the image data from the travel easiness database DB2 using the record management unit 141 under the condition in which the available recordable amount of the travel easiness database DB2 is less than the predetermined value (step S20) and then ends the data transmission control shown in FIG. 6.

When determined that the vehicle 100 is traveling based on the vehicle data obtained from the vehicle information obtaining unit 111 (step S12=NO), the vehicle image data transmission device ends the data transmission control shown in FIG. 6 without transmitting image data. Also, when the travel easiness database DB2 does not contain image data that has not been transmitted (step S13=NO), the vehicle image data transmission device ends the data transmission control shown in FIG. 6 without transmitting image data.

The data transmission control executed by the vehicle image data transmission device of the present embodiment through the vehicle external network NW2 will now be described.

FIG. 7A shows one example of data contents that are transmission subjects in the data transmission control through the vehicle external network NW2. As shown in FIG. 7A, the on-vehicle communication device 120 regularly transmits the travel easiness score, which has a relatively small data size among the transmission subjects of data, regardless of the communication load of the vehicle external network NW2. However, the on-vehicle communication device 120 transmits the image data, which has a relatively large data size among the transmission subjects of data, when the vehicle 100 is traveling an easy location, that is, under a condition in which the communication load of the vehicle external network NW2 is less than a predetermined value.

FIG. 7B shows one example of data saving management performed on the memory 121 of the on-vehicle communication device 120 in the data transmission control through the vehicle external network NW2. As shown in FIG. 7B, under a condition in which an available recordable amount of the memory 121 is less than a predetermined value, the on-vehicle communication device 120 controls whether or not to save image data stored in the memory 121 while monitoring the travel easiness score determined based on the image data and the elapsed time from when the image data was obtained. More specifically, the on-vehicle communication device 120 manages image data having a travel easiness score that is less than the predetermined score indicating the difficult traveling tendency in the following manner. The on-vehicle communication device 120 saves only image data in which time elapsed from when the image data was obtained is "within five minutes" or "between five and fifteen minutes" and thus the image data has relatively high freshness in the memory 121 as a transmission subject. The on-vehicle communication device 120 deletes image data in which time elapsed from when the image data was obtained is "more than fifteen minutes" and thus the image data has relatively low freshness from the memory 121.

Additionally, the on-vehicle communication device 120 manages image data stored in the memory 121 having a travel easiness score that is greater than or equal to the predetermined score indicating the easy traveling tendency in the following manner. The on-vehicle communication device 120 saves only image data in which time elapsed from when the image data was obtained is "within five minutes" and thus the image data has particularly high freshness in the memory 121 as a transmission subject. The on-vehicle communication device 120 deletes image data in which time elapsed from when the image data was obtained is "between five and fifteen minutes" and "more than fifteen minutes" and thus the image data has relatively low freshness from the memory 121.

In the present embodiment, when determined that the effectiveness of image data has been decreased as time elapses from when the image data was obtained, the image data is deleted from the memory 121 of the on-vehicle communication device 120. Allowed time (second allowed time) before the data deletion is set so that the allowed time ("fifteen minutes") of image data having a travel easiness score indicating the difficult traveling tendency is longer than the allowed time ("five minutes") of image data having a travel easiness score indicating the easy traveling tendency. Thus, the image data having a travel easiness score indicating the difficult traveling tendency takes priority and remains in the memory 121 while the available recordable amount of the finite memory 121 is appropriately maintained.

In the present embodiment, when image data having a travel easiness score indicating the difficult traveling tendency and image data having a travel easiness score indicating the easy traveling tendency are both in the memory 121, the image data image data having a travel easiness score indicating the difficult traveling tendency is given priority and transmitted even when the time elapsed from when the image data was obtained is within the above allowed time. This also increases the frequency for transmitting the image data having a travel easiness score indicating the difficult traveling tendency from the vehicle 100 to the management center 200.

The procedures of data transmission control executed by the vehicle image data transmission device of the present embodiment through the vehicle external network NW2 will now be described with reference to the flowchart shown in FIG. 8. The data transmission control is also repeated in a predetermined cycle. In parallel with the data transmission control shown in FIG. 8, a process for storing the image data and the travel easiness score in the memory 121 of the on-vehicle communication device 120 is performed in a predetermined cycle.

Figure 8:
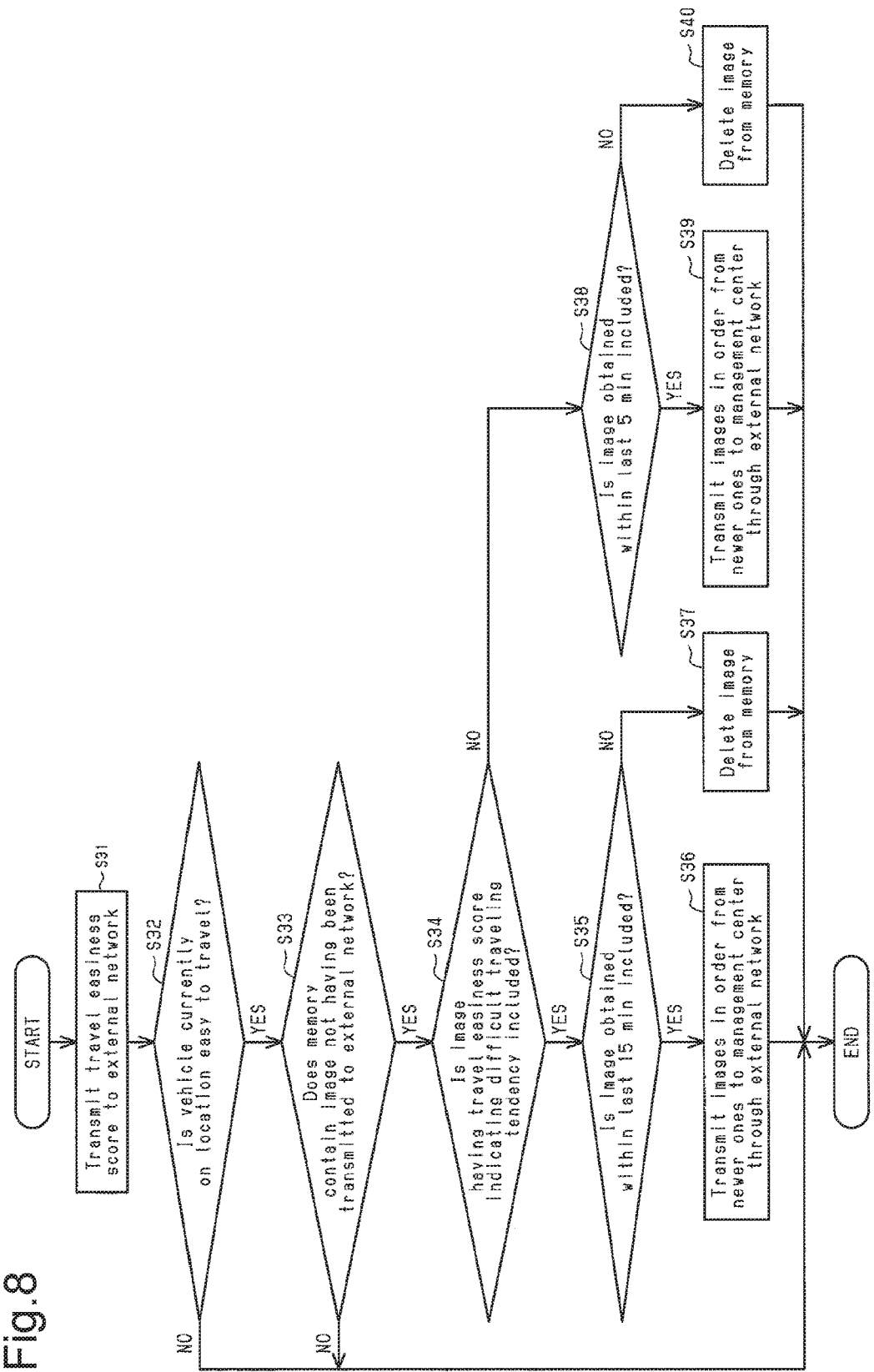
FIG. 8 is a flowchart showing the procedures of data transmission control executed by the vehicle image data transmission device of FIG. 2 through the vehicle external network.

As shown in FIG. 8, the vehicle image data transmission device transmits a travel easiness score that is stored in the memory 121 to the management center 200 from the on-vehicle communication device 120 through the vehicle external communication NW2 (step S31).

The vehicle image data transmission device determines, using the on-vehicle communication device 120, whether or not the vehicle 100 is currently traveling an easy location based on the travel easiness score calculated by the travel easiness score calculation unit 140 (step S32). When determined that the vehicle 100 is currently traveling an easy location (step S32=YES), the vehicle image data transmission device determines, using the on-vehicle communication device 120, whether or not the memory 121 contains image data that has not been transmitted to the vehicle external network NW2 (step S33).

When image data not having been transmitted is contained (step S33=YES), the vehicle image data transmission device determines, using the on-vehicle communication device 120, whether or not the image data includes image data having a travel easiness score indicating the difficult traveling tendency (step S34).

When image data having a travel easiness score indicating the difficult traveling tendency is included (step S34=YES), the vehicle image data transmission device determines, using the on-vehicle communication device 120, whether or not the image data includes image data in which time elapsed from when the image data was obtained is within fifteen minutes (step S35).

When the image data having a travel easiness score indicating the difficult traveling tendency includes image data in which time elapsed from when the image data was obtained is within fifteen minutes (step S35=YES), the vehicle image data transmission device transmits pieces of the image data in order from ones having newer obtained date and time to the management center 200 from the on-vehicle communication device 120 through the vehicle external network NW2 (step S36) and then ends the data transmission control shown in FIG. 8.

When the image data having a travel easiness score indicating the difficult traveling tendency does not include image data in which time elapsed from when the image data was obtained is within fifteen minutes (step S35=NO), the vehicle image data transmission device deletes the image data from the memory 121 of the on-vehicle communication device 120 under the condition in which the available recordable amount of the memory 121 of the on-vehicle communication device 120 is less than the predetermined value (step S37) and then ends the data transmission control shown in FIG. 8.

In step S34, when the image data having a travel easiness score indicating the difficult traveling tendency is not included (step S34=NO), the vehicle image data transmission device determines, using the on-vehicle communication device 120, whether or not the image data includes image data in which time elapsed from when the image data was obtained is within five minutes (step S38).

When image data in which time elapsed from when the image data was obtained is within five minutes is included (step S38=YES), the vehicle image data transmission device transmits pieces of the image data in order from ones having newer obtained date and time to the management center 200 from the on-vehicle communication device 120 through the vehicle external network NW2 (step S39) and then ends the data transmission control shown in FIG. 8.

When the image data not having been transmitted does not include image data in which time elapsed from when the image data was obtained is within five minutes (step S38=NO), the vehicle image data transmission device deletes the image data from the memory 121 of the on-vehicle communication device 120 under the condition in which the available recordable amount of the memory 121 of the on-vehicle communication device 120 is less than the predetermined value (step S40) and then ends the data transmission control shown in FIG. 8.

When determined that the vehicle 100 is currently traveling a difficult location based on the travel easiness score calculated by the travel easiness score calculation unit 140 (step S32=NO), the vehicle image data transmission device ends the data transmission control shown in FIG. 8 without transmitting image data. Also, when the memory 121 of the on-vehicle communication device 120 does not contain image data that has not been transmitted (step S33=NO), the vehicle image data transmission device ends the data transmission control shown in FIG. 8 without transmitting image data.

The operation of the vehicle image data transmission device of the present embodiment will now be described.

When transmitting image data obtained by the vehicle 100 to the management center 200, the image data needs to pass through the vehicle internal network NW1, which is from the travel easiness database DB2 to the on-vehicle communication device 120, and the vehicle external network NW2, which is from the on-vehicle communication device 120 to the management center 200.

The vehicle internal network NW1 and the vehicle external network NW2 are independent asynchronous networks. Thus, even when the communication load of the vehicle internal network NW1 is relatively small, the communication load of the vehicle external network NW2 may not be relatively small at the same time. When image data is not smoothly transmitted due to one of the vehicle internal network NW1 and the vehicle external network NW2 having a relatively large communication load, the reliability for transmitting image data to the management center 200 from the vehicle 100 is deteriorated.

In this regard, in the present embodiment, the vehicle 100 separately monitors the communication load of the vehicle internal network NW1 and the communication load of the vehicle external network NW2. For example, when the communication load of the vehicle internal network NW1 is relatively large, at least image data obtained from the image obtaining unit 110 is stored in the travel easiness database DB2. Subsequently, when the communication load of the vehicle internal network NW1 becomes relatively small, the image data stored in the travel easiness database DB2 is transmitted to the on-vehicle communication device 120 through the vehicle internal network NW1. This limits situations in which the image data transmission takes time or is interrupted due to increases in the communication load of the vehicle internal network NW1. Thus, the image data transmission to the on-vehicle communication device 120 is achieved through the vehicle internal network NW1 with high reliability. Additionally, the storing of image data in the travel easiness database DB2 increases the frequency for transmitting image data, including image data obtained when the communication load of the vehicle internal network NW1 is relatively large, to the on-vehicle communication device 120 through the vehicle internal network NW1.

In this case, if the communication load of the vehicle internal network NW1 is relatively small even when the communication load of the vehicle external network NW2 is relatively large, image data is transmitted to the on-vehicle communication device 120 from the travel easiness database DB2 through the vehicle internal network NW1. Additionally, the transmitted image data is temporarily stored in the memory 121 of the on-vehicle communication device 120. Subsequently, when the communication load of the vehicle external network NW2 becomes relatively small, the on-vehicle communication device 120 transmits the image data stored in the memory 121 to the management center 200 through the vehicle external network NW2. This limits situations in which the image data transmission takes time or is interrupted due to increases in the communication load of the vehicle external network NW2. Thus, the image data transmission to the management center 200 is achieved through the vehicle external network NW2 with high reliability. Further, even if the image data transmission is restricted in accordance with the communication loads of the vehicle internal network NW1 and the vehicle external network NW2, an opportunity for transmitting image data is ensured without waiting until the communication loads of both networks become relatively small.

Accordingly, the embodiment has the advantages described below.

(1) Under a condition in which the communication load of the vehicle internal network NW1 is less than a predetermined value (first predetermined value), the communication controller 150 transmits image data recorded in the travel easiness database DB2 to the on-vehicle communication device 120 through the vehicle internal network NW1. The on-vehicle communication device 120 includes the memory 121 that stores the transmitted image data. When transmitted to the on-vehicle communication device 120, the image data is stored in the memory 121 of the on-vehicle communication device 120. Under a condition in which the communication load of the vehicle external network NW2 is less than a predetermined value (second predetermined value), the on-vehicle communication device 120 transmits the image data stored in the memory 121 to the management center 200 through the vehicle external network NW2. More specifically, in the transmission of image data from the vehicle 100 to the management center 200, image data is transmitted through each of the two asynchronous networks between the vehicle 100 and the management center 200, namely, the vehicle internal network NW1, which is from a record device (travel easiness database DB2) to the on-vehicle communication device 120, and the vehicle external network NW2, which is from the on-vehicle communication device 120 to the management center 200, only when the corresponding communication load is relatively small. When the communication loads of the networks NW1, NW2 are relatively large, image data is not transmitted and instead stored in the record device (travel easiness database DB2) or the memory 121, respectively. This allows the image data obtained by the vehicle 100 to be transmitted to the management center 200 with high reliability while taking into consideration the different network environments inside and outside the vehicle.

(2) The communication controller 150 determines that the communication load of the vehicle internal network NW1 is less than a predetermined value when the vehicle 100 is parked or stopped and that the communication load of the vehicle internal network NW1 is greater than or equal to the predetermined value when the vehicle 100 is traveling. In this manner, when the communication load of the vehicle internal network NW1 is determined based on whether or not the vehicle 100 is traveling, the determination accuracy is appropriately maintained in a simple manner.

(3) The on-vehicle communication device 120 determines that the communication load of the vehicle external network NW2 is less than a predetermined value when the travel easiness score is greater than or equal to a predetermined score and that the communication load of the vehicle external network NW2 is greater than or equal to the predetermined value when the travel easiness score is less than the predetermined score. In this manner, when the communication load of the vehicle external network NW2 is determined based on the travel easiness score, the determination accuracy is appropriately maintained in a simple manner.

(4) The travel easiness score calculation unit 140 calculates a travel easiness score based on image data obtained from the image obtaining unit 110. Thus, the travel easiness score is calculated based on the image data that directly represents the number of other vehicles and pedestrians. This improves the accuracy for determining the communication load of the vehicle external network NW2.

(5) When transmitting image data to the on-vehicle communication device 120 from the travel easiness database DB2 through the vehicle internal network NW1, the communication controller 150 gives priority to image data associated with a travel easiness score that is less than the predetermined score over image data associated with a travel easiness score that is greater than or equal to the predetermined score. This increases the frequency for transmitting image data that is relatively valuable as information uploaded from the on-vehicle communication device 120 and ultimately increases the frequency of updates in the management center 200.

(6) The record management unit 141 deletes image data from the travel easiness database DB2 when the time elapsed from when the image data was obtained exceeds the allowed time (first allowed time). Also, the record management unit 141 sets the allowed time longer when the travel easiness score associated with image data is less than the predetermined score than when the travel easiness score time associated with image data is greater than or equal to the predetermined score. Thus, the image data having a travel easiness score indicating the difficult traveling tendency takes priority and remains in the travel easiness database DB2 over the image data having a travel easiness score indicating the easy traveling tendency. In this regard, the image data that is relatively valuable as information uploaded through the on-vehicle communication device 120 is likely to be transmitted to the on-vehicle communication device 120.

(7) When transmitting image data to the management center 200 from the on-vehicle communication device 120 through the vehicle external network NW2, the on-vehicle communication device 120 gives priority to image data associated with a travel easiness score that is less than the predetermined score over image data associated with a travel easiness score that is greater than or equal to the predetermined score. This increases the frequency for transmitting image data that is relatively valuable as information uploaded through the on-vehicle communication device 120.

(8) The on-vehicle communication device 120 deletes image data from the memory 121 when the time elapsed from when the image data was obtained exceeds the allowed time (second allowed time). Also, the on-vehicle communication device 120 sets the allowed time when the travel easiness score associated with image data is less than the predetermined score than when the travel easiness score associated with image data is greater than or equal to the predetermined score. Thus, image data having a travel easiness score indicating the difficult traveling tendency takes priority and remains in the memory 121 over image data having a travel easiness score indicating the easy traveling tendency. In this regard, the image data that is relatively valuable as information uploaded through the on-vehicle communication device 120 is likely to be transmitted to the on-vehicle communication device 120. The first allowed time and the second allowed time may be the same or different from each other.

(9) When the transmission frequency of image data is increased in a process for transmitting the image data to the memory 121 of the on-vehicle communication device 120 from the travel easiness data DB2, the on-vehicle communication device 120 also increases the transmission frequency of the image data in a process for transmitting the image data to the management center 200 from the on-vehicle communication device 120. Thus, of the image data that is relatively valuable and has been transmitted to the on-vehicle communication device 120 from the travel easiness database DB2, image data having a travel easiness score that is less than the predetermined score indicating the difficult traveling tendency is further given priority and transmitted to the management center 200 from the on-vehicle communication device 120. This further increases the value of the image data uploaded through the on-vehicle communication device 120. Additionally, in the memory 121, the data deletion allowed time for the stored image data is set longer for image data indicating that the traveling is difficult based on the travel easiness score than for image data indicating that the traveling is easy based on the travel easiness score. This further increases the value of the image data uploaded through the on-vehicle communication device 120.

(10) The communication controller 150 and the on-vehicle communication device 120 transmit the travel easiness score, which has a relatively small data size among transmission subjects of data, from the record management unit 141 to the on-vehicle communication device 120 or from the on-vehicle communication device 120 to the management center 200 regardless of the communication loads of the vehicle internal network NW1 and the vehicle external network NW2. More specifically, even when the communication loads of the vehicle internal network NW1 and the vehicle external network NW2 continue to be relatively large for a long time, at least the travel easiness score is regularly transmitted to the on-vehicle communication device 120 and the management center 200. This ensures the frequency for updating at least the travel easiness score in the management center 200 as information uploaded through the on-vehicle communication device 120.

(11) When the available recordable amount of the travel easiness database DB2 is less than a predetermined value, the record management unit 141 deletes image data based on the time elapsed from when the image data was obtained. This ensures the available recordable amount of the travel easiness database DB2.

(12) When the available recordable amount of the memory 121 is less than a predetermined value, the on-vehicle communication device 120 deletes image data based on the time elapsed from when the image data was obtained. This ensures the available recordable amount of the memory 121 of the on-vehicle communication device 120.

It should be apparent to those skilled in the art that the present invention may be embodied in many other specific forms without departing from the scope of the invention. Particularly, it should be understood that the present invention may be embodied in the following forms.

In the embodiment, under the condition in which the available recordable amount of the travel easiness database DB2 is less than the predetermined value, the record management unit 141 controls whether or not to save image data stored in the travel easiness database DB2 while monitoring the travel easiness score determined based on the image data and the time elapsed from when the image data was obtained. Also, under the condition in which the available recordable amount of the memory 121 is less than the predetermined value, the on-vehicle communication device 120 controls whether or not to save image date stored in the memory 121 while monitoring the travel easiness score determined based on the image data and the time elapsed from when the image data was obtained. However, whether or not to save image data may be controlled based on the travel easiness score and the time elapsed from when the image data was obtained without considering the available recordable amounts of the travel easiness database DB2 and the memory 121.

In the embodiment, the communication controller 150 sets priority based on the travel easiness score, and the record management unit 141 changes the data deletion allowed time (first allowed time) based on the travel easiness score. This increases the proportion of image data associated with a travel easiness score that is less than the predetermined score in image data sent to the on-vehicle communication device 120. Additionally, the on-vehicle communication device 120 sets the priority and the data deletion allowed time (second allowed time) based on the travel easiness score. However, such setting does not necessarily have to be performed twice. The setting of the communication controller 150 and the record management unit 141 may be omitted. Thus, only the on-vehicle communication device 120 may set the priority and the allowed time of the data deletion in the image data transmitted from the travel easiness database DB2 based on the travel easiness score.

Alternatively, the setting of the on-vehicle communication device 120 may be omitted. Thus, only the communication controller 150 and the record management unit 141 may set the priority based on the travel easiness score and change the data deletion allowed time based on the travel easiness score. This also increases the proportion of the image data associated with a travel easiness score that is less than the predetermined score in the image data transmitted to the management center 200 from the on-vehicle communication device 120. In this case, the memory 121 of the on-vehicle communication device 120 only needs to function as a buffer that temporarily store image data transmitted from the travel easiness database DB2 in a sequential manner. This also simplifies the function of the on-vehicle communication device 120.

Further, when the vehicle image data transmission device is adapted only to transmit image data corresponding to the travel easiness score to the management center 200 from the vehicle 100, the device may be configured to transmit image data through the corresponding networks without setting the priority and the data deletion allowed time based on the travel easiness score.

Figure 9:
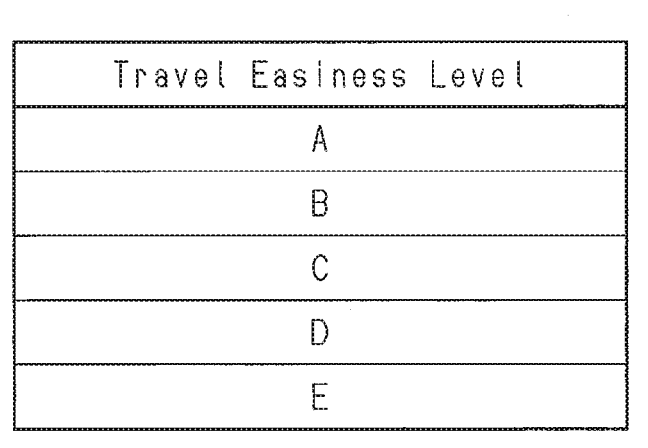

In the embodiment, the travel easiness score calculation unit 140 calculates an evaluation value of each element hindering the vehicle from traveling, for example, the number of pedestrians, bicycles, and other vehicles around the vehicle, by analyzing the image data and then calculates the added value of the evaluation values, which has been calculated for each element, as the travel easiness score. Instead, as shown in FIG. 9, the travel easiness score calculation unit 140 may provide each of the levels "A," "B," "C," "D," and "E" with a determination standard related to an image characteristic amount of image data that specifies the corresponding level through a statistical process performed on predetermined categorized training data. When unknown image data is newly obtained, the image characteristic amount extracted from the image data may be used as an input to specify the level of the travel easiness score based on the determination standard.

In the embodiment, the travel easiness score calculation unit 140 calculates the travel easiness score based on image data obtained from the image obtaining unit 110. Instead, the travel easiness score calculation unit 140 may calculate the travel easiness score based on vehicle data that reflects the number of other vehicles and pedestrians. The calculated travel easiness score may be used to determine the communication load of the vehicle external network NW2 or perform the data saving management of image data on the record device. The vehicle data only needs to be a parameter that varies in accordance with the existence or the kind of obstacle affecting the vehicle travel easiness and may be, for example, a "difference between a maximum steering angle and a minimum steering angle," "time for operating the steering angle," a "difference between a maximum estimated vehicle acceleration and a minimum estimated vehicle acceleration," a "maximum value of the estimated vehicle acceleration," a "maximum value of an accelerator depression amount," and a "difference between a maximum speed and a minimum speed."

In the embodiment, the on-vehicle communication device 120 determines the communication load of the vehicle external network NW2 in accordance with the travel easiness score obtained by the travel easiness score calculation unit 140. Instead, the on-vehicle communication device 120 may determine the communication load of the vehicle external network NW2, for example, through a method for calculating the arrival ratio of packets transmitted to the management center 200 from the vehicle 100 by counting reception acknowledgement signals (ACK signals) that the vehicle 100 has received from the management center 200.

In the embodiment, the communication controller 150 determines the communication load of the vehicle internal network NW1 in accordance with the travel state of the vehicle 100. Instead, the communication controller 150 may determine the communication load of the vehicle internal network NW1, for example, through a process for measuring the proportion occupied by communication messages flowing through the vehicle internal network NW1 per unit time.

In the embodiment, the road link ID indicating the current location of the vehicle when image data is obtained is associated with the image data when transmitted (uploaded) to the management center 200 from the vehicle 100. However, if the current location of the vehicle 100 can be specified at the side of the management center 200 in a process for establishing wireless communication between the vehicle 100 and the management center 200, the vehicle 100 does not necessarily have to associate the corresponding road link ID with the image data that is a transmission subject.

In the embodiment, the configuration of the vehicle image data transmission device is described so that the record management unit 141, which manages data recorded in the travel easiness database DB2, and the communication controller 150, which transmits image data recorded in the travel easiness database DB2 to the on-vehicle communication device 120, have separate hardware configurations. Instead, the communication controller 150 may have the function of the record management unit 141. The communication controller 150 may store image data obtained from the image obtaining unit 110 in the travel easiness database DB2 and transmit the stored image data to the on-vehicle communication device 120 from the travel easiness database DB2. The vehicle image data transmission device that transmits an image of a vehicle exterior obtained when driving the vehicle to the management center, which manages the travel information from a plurality of vehicles, through the on-vehicle communication device only needs to be configured to include the image obtaining unit, which obtains image data of a vehicle exterior, the travel easiness database, which functions as a record device that records the image data obtained from the image obtaining unit, and the communication controller configured to transmit the image data recorded in the record device to the on-vehicle communication device under a condition in which the communication load of the vehicle internal network mounted in the vehicle is less than a predetermined value. The on-vehicle communication device includes the memory, which stores the transmitted image data, and is configured to transmit the stored image data to the management center under a condition in which the communication load of the vehicle external network for mobile communication is less than a predetermined value.

The present examples and embodiments are to be considered as illustrative and not restrictive, and the invention is not to be limited to the details given herein, but may be modified within the scope and equivalence of the appended claims.

The invention claimed is:

1. A vehicle image data transmission device that transmits image data obtained when driving a vehicle by capturing an image of a vehicle exterior to a management center that manages travel information of a plurality of vehicles, the vehicle image data transmission device comprising:
   an on-vehicle communication device configured to communicate with the management center through a vehicle external network for mobile communication;
   a camera that obtains the image data of the vehicle exterior;
   a processor configured to calculate a travel easiness score that indicates easiness for the vehicle to travel, which reflects a number of other vehicles and a number of pedestrians based on the image data;
   a database that records image data obtained from the camera; and
   a communication controller configured to transmit image data recorded in the database to the on-vehicle communication device through a vehicle internal network mounted in the vehicle under a condition in which the vehicle internal network has a communication load that is less than a first predetermined value, wherein
   the on-vehicle communication device includes a memory that stores image data received from the communication controller,
   the on-vehicle communication device is configured to determine that a communication load of the vehicle external network is less than a second predetermined value when the calculated travel easiness score is greater than or equal to a predetermined score and that the communication load of the vehicle external network is greater than or equal to the second predetermined value when the calculated travel easiness score is less than the predetermined score, and
   the on-vehicle communication device is configured to transmit image data stored in the memory to the management center under a condition in which the vehicle external network has a communication load that is less than the second predetermined value.

2. The vehicle image data transmission device according to claim 1, wherein the communication controller is configured to determine that the communication load of the vehicle internal network is less than the first predetermined value when the vehicle is parked or stopped and that the communication load of the vehicle internal network is greater than or equal to the first predetermined value when the vehicle is traveling.

3. A vehicle image data transmission device that transmits image data obtained when driving a vehicle by capturing an image of a vehicle exterior to a management center that manages travel information of a plurality of vehicles, the vehicle image data transmission device comprising:
   an on-vehicle communication device configured to communicate with the management center through a vehicle external network for mobile communication;
   a camera that obtains the image data of the vehicle exterior;
   a database that records image data obtained from the camera;
   a communication controller configured to transmit image data recorded in the database to the on-vehicle communication device through a vehicle internal network mounted in the vehicle under a condition in which the vehicle internal network has a communication load that is less than a first predetermined value; and
   a processor configured to calculate a travel easiness score that indicates easiness for the vehicle to travel, which reflects a number of other vehicles and a number of pedestrians, based on image data obtained from the camera; and wherein
   the on-vehicle communication device includes a memory that stores image data received from the communication controller,
   the on-vehicle communication device is configured to transmit image data stored in the memory to the management center under a condition in which the vehicle external network has a communication load that is less than a second predetermined value,
   the processor is configured to manage data recorded in the database,
   the processor is configured to record image data in the database associated with time when the image data is obtained by the camera and the travel easiness score calculated by the processor and delete image data from the database in a state in which an elapsed time from the obtained time exceeds a first allowed time,
   the processor is further configured to set the first allowed time longer when the travel easiness score associated with image data is less than a predetermined score than when the travel easiness score associated with image data is greater than or equal to the predetermined score, and
   the communication controller is configured to transmit image data to the on-vehicle communication device from the database by giving priority to image data associated with a travel easiness score that is less than the predetermined score over image data associated with a travel easiness score that is greater than or equal to the predetermined score.

4. The vehicle image data transmission device according to claim 3, wherein the processor is configured to delete image data from the database in a state in which the elapsed time from the obtained time of the image data exceeds the first allowed time when an available recordable amount of the database is less than a predetermined value.

5. The vehicle image data transmission device according to claim 3, wherein
   the on-vehicle communication device is configured to delete image data from the memory in a state in which an elapsed time from an obtained time of the image data exceeds a second allowed time,
   the on-vehicle communication device is configured to set the second allowed time longer when the travel easiness score associated with image data is less than a predetermined score than when the travel easiness score associated with image data is greater than or equal to the predetermined score, and
   the on-vehicle communication device is configured to transmit image data to the management center by giving priority to image data associated with a travel easiness score that is less than the predetermined score over image data associated with a travel easiness score that is greater than or equal to the predetermined score.

6. The vehicle image data transmission device according to claim 5, wherein the on-vehicle communication device is configured to delete image data from the memory in a state in which the elapsed time from the obtained time of the image data exceeds the second allowed time when an available recordable amount of the memory is less than a predetermined value.

7. A vehicle image data transmission device that transmits image data obtained when driving a vehicle by capturing an image of a vehicle exterior to a management center that manages travel information of a plurality of vehicles, the vehicle image data transmission device comprising:
   an on-vehicle communication device configured to communicate with the management center through a vehicle external network for mobile communication;
   a camera that obtains the image data of the vehicle exterior;
   a database that records image data obtained from the camera;
   a communication controller configured to transmit image data recorded in the database to the on-vehicle communication device through a vehicle internal network mounted in the vehicle under a condition in which the vehicle internal network has a communication load that is less than a first predetermined value; and
   a processor configured to calculate a travel easiness score that indicates easiness for the vehicle to travel, which reflects a number of other vehicles and a number of pedestrians, based on image data obtained from the camera; and wherein
   the processor is configured to manage data recorded in the database, wherein
   the processor is configured to record image data in the database associated with time when the image data is obtained by the camera and the travel easiness score calculated by the processor,
   the on-vehicle communication device includes a memory that stores image data received from the communication controller,
   the on-vehicle communication device is configured to record image data received from the database in the memory in addition to the obtained time and the travel easiness score associated with the image data and delete image data from the memory in a state in which an elapsed time from the obtained time exceeds a second allowed time,
   the on-vehicle communication device is configured to set the second allowed time when the travel easiness score associated with image data is less than a predetermined score longer than the second allowed time when the travel easiness score associated with image data is greater than or equal to the predetermined score, and
   the on-vehicle communication device is configured to transmit image data stored in the memory to the management center under a condition in which the vehicle external network has a communication load that is less than a second predetermined value, and
   the on-vehicle communication device is configured to transmit image data to the management center by giving priority to image data associated with a travel easiness score that is less than the predetermined score over image data associated with a travel easiness score that is greater than or equal to the predetermined score.

8. The vehicle image data transmission device according to claim 7, wherein the on-vehicle communication device is configured to delete image data from the memory in a state in which the elapsed time from the obtained time of the image data exceeds the second allowed time when an available recordable amount of the memory is less than a predetermined value.

9. A method for transmitting image data for a vehicle, the method comprising:
   obtaining image data when driving the vehicle by capturing an image of a vehicle exterior with an on-vehicle camera;
   recording the obtained image data in an on-vehicle database;
   transmitting image data recorded in the on-vehicle database to an on-vehicle communication device through a vehicle internal network mounted in the vehicle under a condition in which the vehicle internal network has a communication load that is less than a first predetermined value;
   storing image data transmitted through the vehicle internal network in a memory included in the on-vehicle communication device;
   calculating a travel easiness score that indicates easiness for the vehicle to travel, which reflects a number of other vehicles and a number of pedestrians based on the image data;
   determining that a communication load of a vehicle external network is less than a second predetermined value when the calculated travel easiness score is greater than or equal to a predetermined score and that the communication load of the vehicle external network is greater than or equal to the second predetermined value when the calculated travel easiness score is less than the predetermined score; and
   transmitting image data stored in the memory to a management center through the vehicle external network for mobile communication under a condition in which the vehicle external network has a communication load that is less than the second predetermined value.

* * * * *